(12) United States Patent
Mori

(10) Patent No.: US 11,130,207 B2
(45) Date of Patent: Sep. 28, 2021

(54) TRANSPORT TOOL USED FOR TRANSPORTING OBJECT

(71) Applicant: FANUC CORPORATION, Yamanashi (JP)

(72) Inventor: Masayoshi Mori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 103 days.

(21) Appl. No.: 16/276,843

(22) Filed: Feb. 15, 2019

(65) Prior Publication Data

US 2019/0262953 A1 Aug. 29, 2019

(30) Foreign Application Priority Data

Feb. 23, 2018 (JP) .............................. JP2018-031066

(51) Int. Cl.
*B23P 19/10* (2006.01)
*B23P 19/04* (2006.01)
(Continued)

(52) U.S. Cl.
CPC .............. *B23P 19/10* (2013.01); *B23P 19/04* (2013.01); *B66C 1/00* (2013.01); *B66F 9/00* (2013.01)

(58) Field of Classification Search
CPC . B23P 19/10; B23P 19/04; B23P 11/00; B23P 11/005; B23P 17/00; B66C 1/22;
(Continued)

(56) References Cited

U.S. PATENT DOCUMENTS 3,561,615 A * 2/1971 Forsberg .................. F16L 1/09
 29/237
5,066,189 A 11/1991 Shell
(Continued)

FOREIGN PATENT DOCUMENTS

CN 101489897 A 7/2009
CN 203624814 U 6/2014
(Continued)

OTHER PUBLICATIONS

English Abstract and Machine Translation for Japanese Publication No. 2013-022688 A, published Feb. 4, 2013, 64 pgs.
(Continued)

*Primary Examiner* — Lee D Wilson
*Assistant Examiner* — Seahee Hong
(74) *Attorney, Agent, or Firm* — Fredrikson & Byron, P.A.

(57) ABSTRACT

A transport tool capable of carrying out attaching an object to an attachment position while positioning the object in a predetermined positional relationship with the attachment position. The transport tool includes a base, a holding section movably supported by the base in a predetermined direction and configured to hold an object, and a positioning section that is provided to the base and configured to arrange the object held by the holding section in a preparation position having a predetermined positional relationship with the attachment position, the positioning section allowing the execution of an attachment operation of attaching the object, which has been arranged in the preparation position, to the attachment position by movement of the holding section relative to the base.

7 Claims, 20 Drawing Sheets

(51) Int. Cl.
*B66F 9/00* (2006.01)
*B66C 1/00* (2006.01)

(58) Field of Classification Search
CPC .... B66C 1/24; B66C 1/42; B66C 1/62; B66C 1/625; B66C 1/66; B66F 19/00; B66F 2700/09; Y10T 29/53678; Y10T 29/53683
See application file for complete search history.

(56) References Cited

U.S. PATENT DOCUMENTS

| | | | | |
|---|---|---|---|---|
| 5,344,207 | A * | 9/1994 | Grimm | B66C 1/422 294/103.1 |
| 6,502,878 | B1 | 1/2003 | Peters et al. | |
| 8,733,809 | B2 * | 5/2014 | Laurent | B66C 1/12 294/74 |
| 9,649,754 | B1 * | 5/2017 | Chalmers | B25B 27/10 |
| 2003/0025347 | A1 * | 2/2003 | Shwaykowski | B66C 1/422 294/104 |
| 2005/0056818 | A1 * | 3/2005 | Harrah | B66F 1/06 254/133 R |

FOREIGN PATENT DOCUMENTS

| | | |
|---|---|---|
| CN | 203682884 U | 7/2014 |
| CN | 204490423 U | 7/2015 |
| CN | 206447538 U | 8/2017 |
| JP | 61162499 A | 7/1986 |
| JP | H10001286 A | 1/1998 |
| JP | H11092075 A | 4/1999 |
| JP | 201322688 A | 2/2013 |

OTHER PUBLICATIONS

English Machine Translation for Japanese Publication No. JPS61162499 A, published Jul. 23, 1986, 5 pgs.
English Abstract and Machine Translation for Japanese Publication No. JPH10-001286 A, published Jan. 6, 1998, 23 pgs.
English Abstract and Machine Translation for Japanese Publication No. JPH11-092075 A, published Apr. 6, 1999, 29 pgs.
English Abstract and Machine Translation for Chinese Publication No. CN 101489897A, published Jul. 22, 2009, 7 pgs.
English Abstract and Machine Translation for Chinese Publication No. CN 203624814U, published Jun. 4, 2014, 6 pgs.
English Abstract and Machine Translation for Chinese Publication No. CN 203682884U, published Jul. 2, 2014, 4 pgs.
English Abstract and Machine Translation for Chinese Publication No. CN 204490423U, published Jul. 22, 2015, 7 pgs.
English Abstract and Machine Translation for Chinese Publication No. CN 206447538U, published Aug. 29, 2017, 6 pgs.
English Machine Translation of Decision to Grant a Patent mailed by Japan Patent Office (JPO) for Application No. JP2018-031066, dated Mar. 17, 2020, 2 pages.
Untranslated Decision to Grant a Patent mailed by Japan Patent Office (JPO) for Application No. JP2018-031066, dated Mar. 17, 2020, 3 pages.
English Machine Translation of Notification of Reasons for Refusal mailed by Japan Patent Office (JPO) for Application No. JP2018-031066, dated Dec. 10, 2019, 4 pages.
Untranslated Notification of Reasons for Refusal mailed by Japan Patent Office (JPO) for Application No. JP2018-031066, dated Dec. 10, 2019, 4 pages.

* cited by examiner

FIG. 9
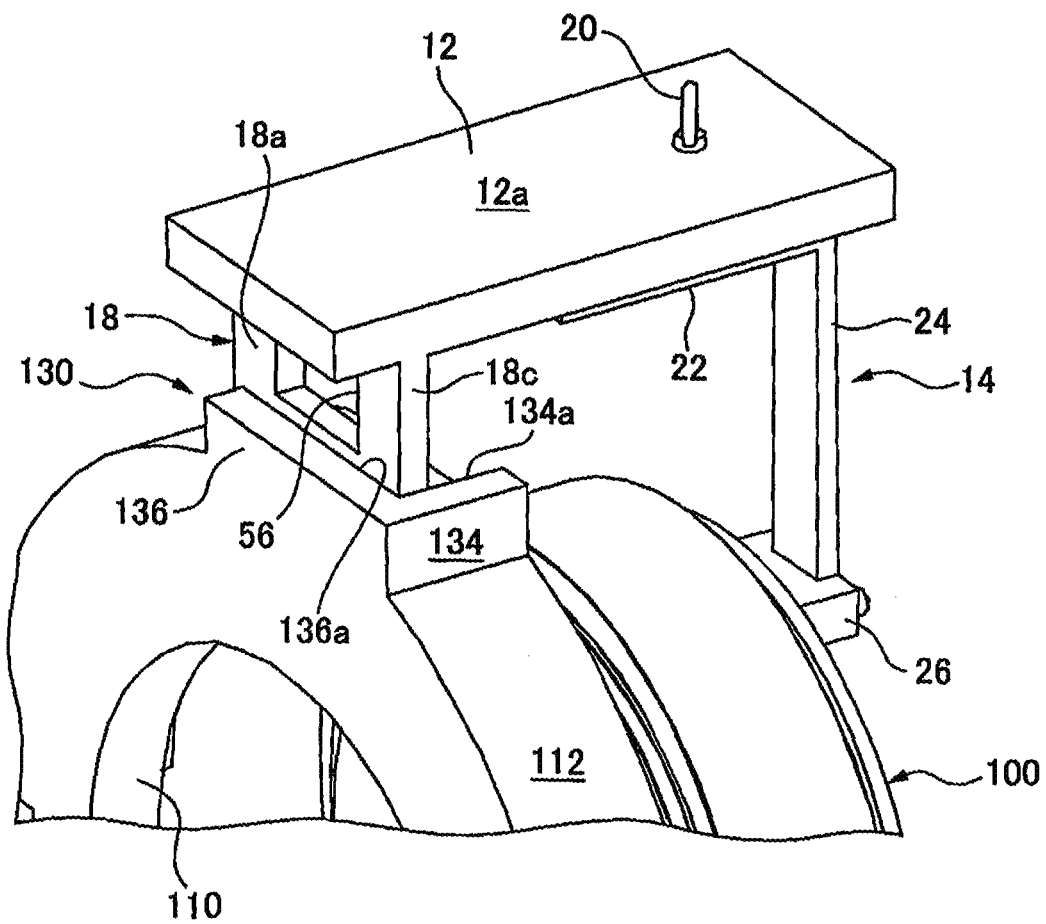
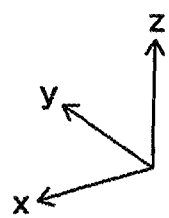

FIG. 17
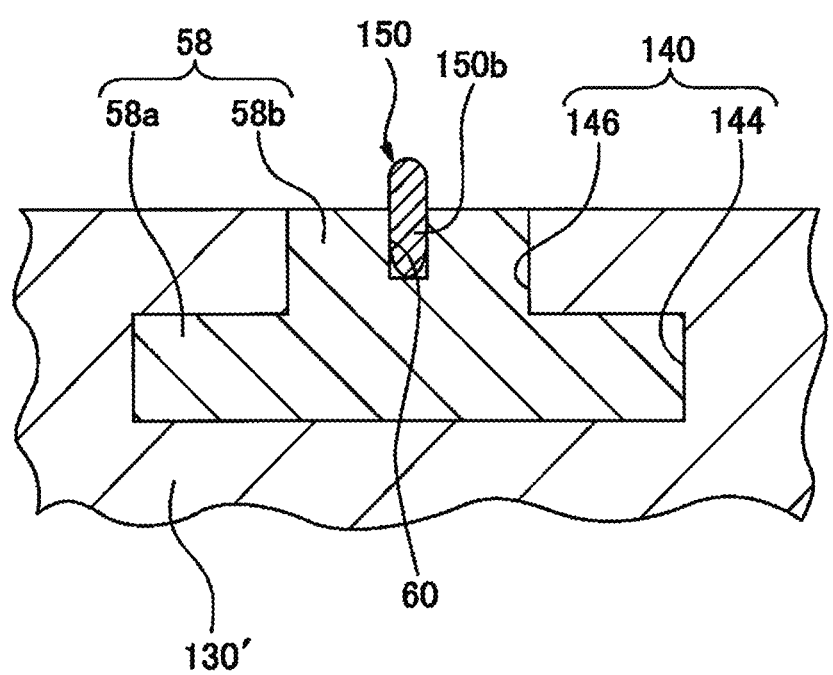
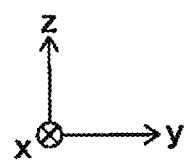

ND OF THE INVENTION

1. Field of the Invention

The present invention relates to a transport tool used for transporting an object.

2. Description of the Related Art

There are known transport tools used for transporting a heavy object (e.g., JP 61-162499 A). When an object is attached to an attachment position, the object may need to be positioned in a predetermined positional relationship with the attachment position. A transport tool capable of executing the operation of attaching an object to an attachment position while positioning the object in a predetermined positional relationship with the attachment position has been in demand.

SUMMARY OF THE INVENTION

According to an aspect of the present disclosure, a transport tool used for transporting an object to be attached to a predetermined attachment position, includes a base; a holding section supported by the base so as to be movable in a predetermined direction and configured to hold the object; and a positioning section provided at the base and configured to arrange the object held by the holding section at a preparation position having a predetermined positional relationship with the attachment position, the positioning section enabling an attachment operation to attach the object arranged at the preparation position to the attachment position by movement of the holding section relative to the base.

According to the present disclosure, when an object needs to be positioned in an attachment position during the attachment of the object, the object can be easily positioned in the attachment position, making it possible to simplify the task of assembling the object. Further, the object can be moved by the holding section while positioned in the attachment position, making it possible to execute the attachment operation of the object without moving heavy machinery.

BRIEF DESCRIPTION OF THE DRAWINGS

FIG. 9 is an enlarged view of the frontward perspective view of the positioning section and the abutting section illustrated in FIG. 7.

FIG. 17 is a cross-sectional view illustrating the positioning section illustrated in FIG. 15 abutted and fixed against the abutting section illustrated in FIG. 16.

DETAILED DESCRIPTION

Figure 1:
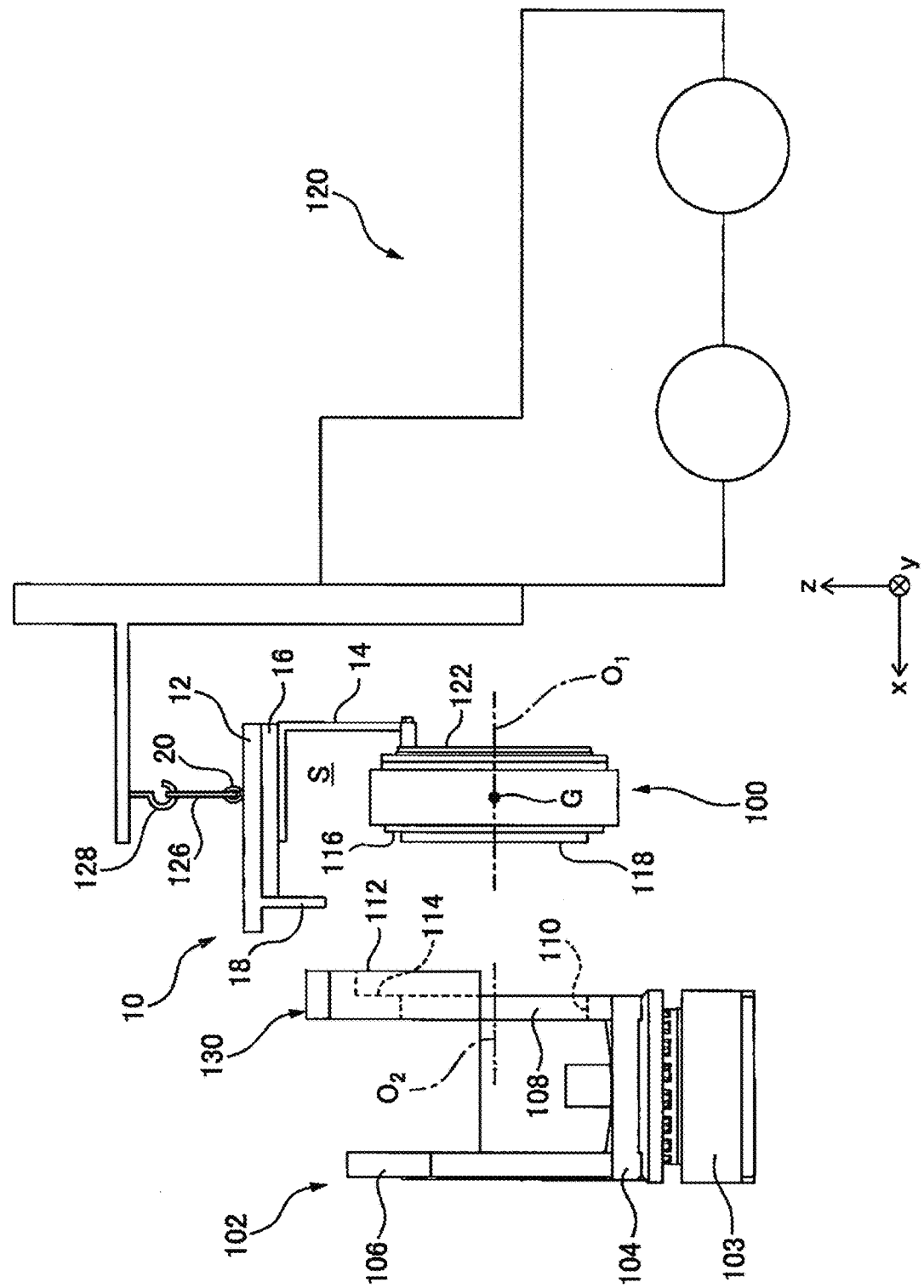
FIG. 1 illustrates a transport tool according to one embodiment, a mounted object, and heavy machinery.

Embodiments of the present disclosure will be described in detail below with reference to the drawings. Note that, in the various embodiments described below, similar components are assigned the same reference numerals, and redundant descriptions thereof will be omitted. Further, in the following description, an orthogonal coordinate system in the drawings is used for a reference of directions, wherein the x-axis positive direction is referred to as frontward, the y-axis positive direction is referred to as rightward, and the z-axis positive direction is referred to as upward, for the sake of convenience. For example, the x-y plane is the horizontal plane.

A transport tool 10 according to an embodiment will be described with reference to FIG. 1 to FIG. 7. The transport tool 10 is used for holding and transporting an object 100. In this embodiment, the object 100 is a reducer having a cylindrical shape with a center axis $O_1$, and includes a multi-stage gear structure (not illustrated) built inside thereof. The object 100 is a heavy object having a weight of 600 kg or greater, for example.

Figure 7:
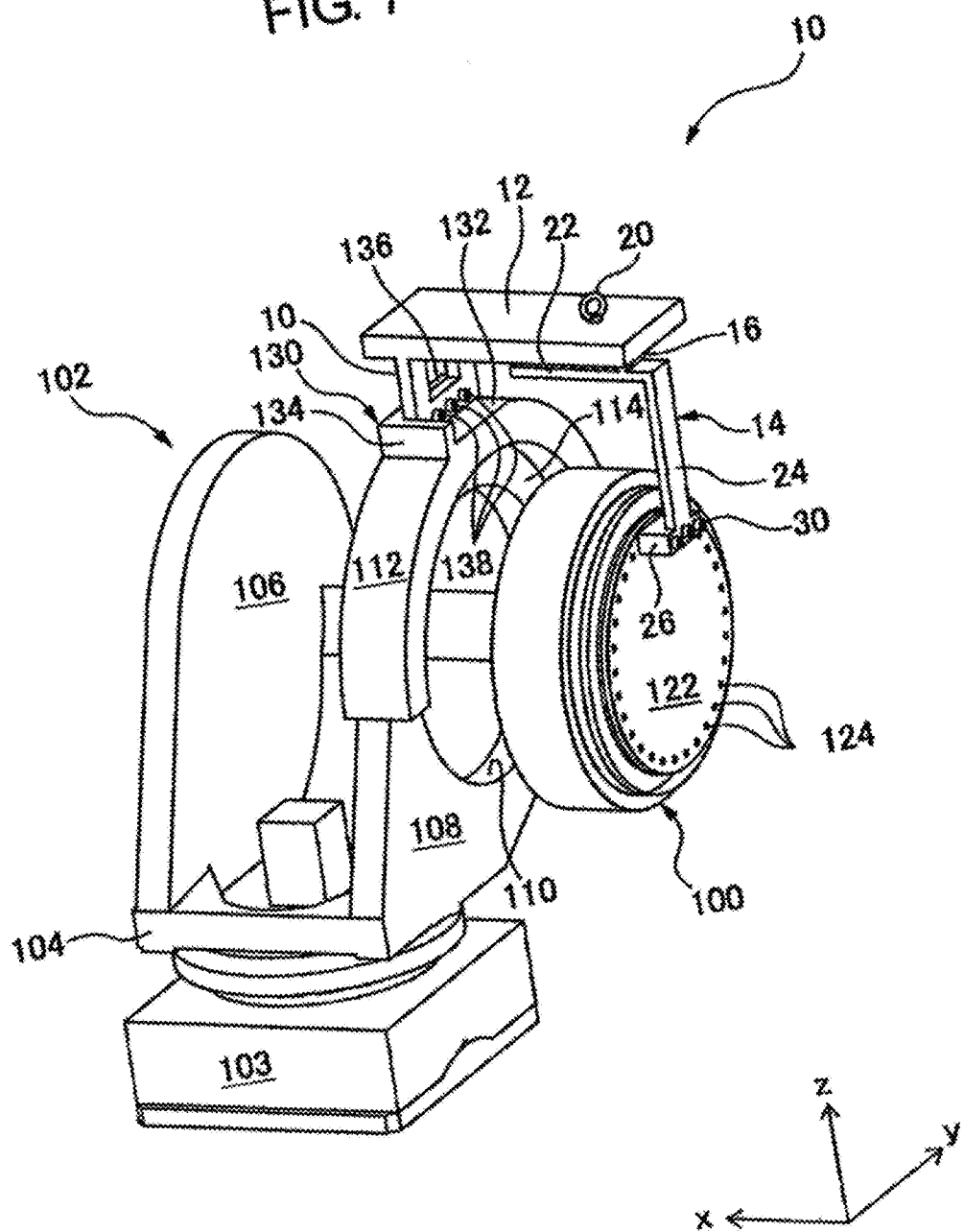
FIG. 7 is a rearward perspective view illustrating the object arranged in a preparation position with a positioning section of the transport tool illustrated in FIG. 2 abutted against an abutting section of the mounting object.

The object 100 is attached to and detached from a mounting object 102. In this embodiment, the mounting object 102 is a turning body of an industrial robot. As illustrated in FIGS. 1 and 7, the mounting object 102 includes a base 104 provided at a robot base 103 so as to be rotatable about a vertical axis, and a pair of side walls 106 and 108 extending upward from the base 104 so as to be opposite to each other.

The side wall 108 is provided with a through hole 110 passing through the side wall 108 in the x-axis direction, and an arc-shaped flange 112 formed at an upper end of the side wall 108 and extending rearward from the side wall 108. The through hole 110 is a circular hole arranged concentrically with the flange 112 and having a center axis $O_2$. Note that, the hole 110 may be a bottomed hole formed so as to be recessed from a mounting face 114 of the side wall 108 without passing through the side wall 108.

A robot arm (not illustrated) is mounted between the pair of side walls 106 and 108 so as to be rotatable about the horizontal axis. The robot base 103, the mounting object (turning body) 102, and the robot arm constitute a vertical articulated robot.

The object 100 is attached to and detached from a predetermined attachment position on the mounting face 114 of the side wall 108. The mounting face 114 is a flat face substantially parallel with the z-y plane, and extends around the through hole 110.

Figure 3:
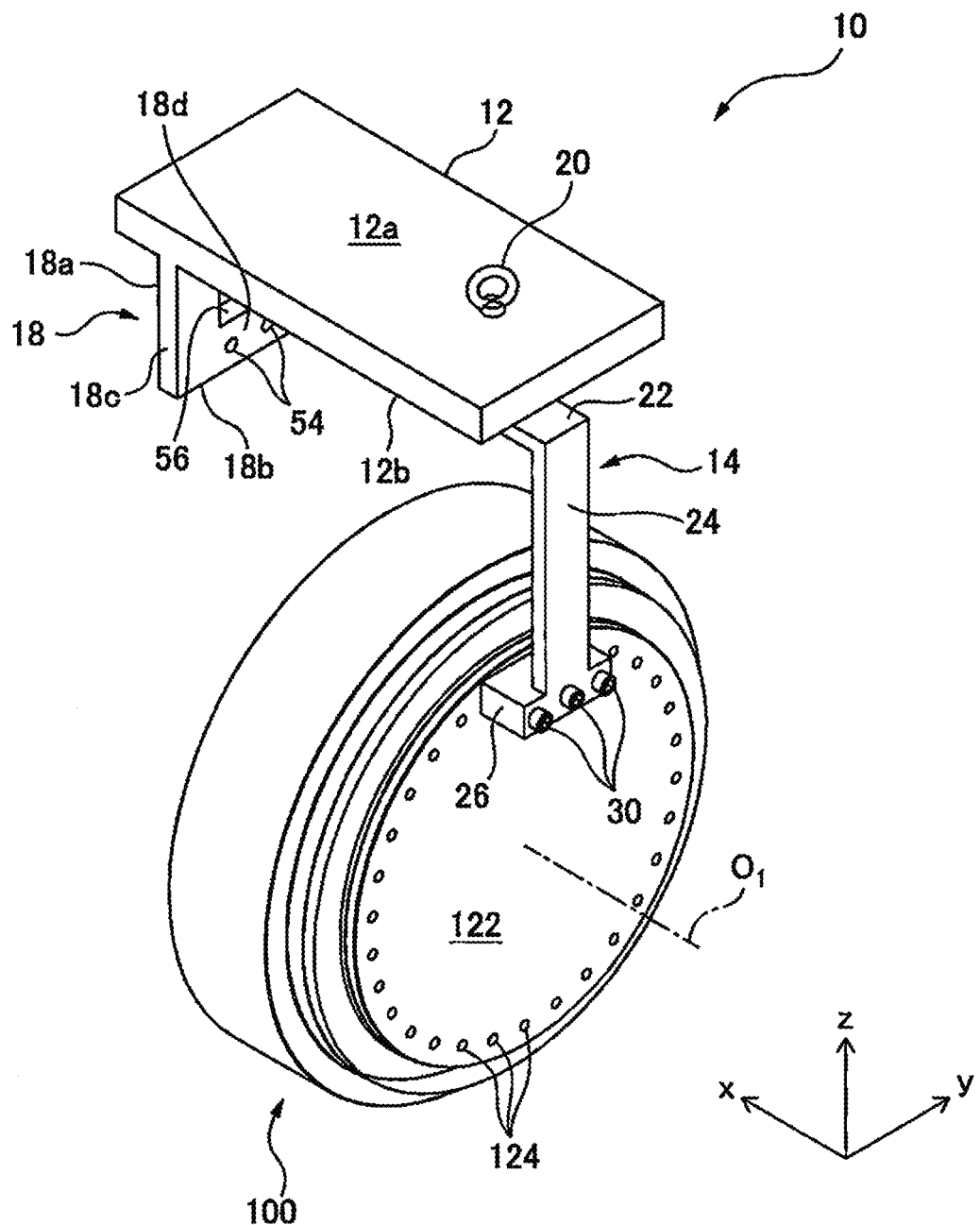
FIG. 3 is a rearward perspective view of the transport tool and the object illustrated in FIG. 2.

The object 100 includes an annular contacting face 116 configured to contact the mounting face 114, a circular-columnar boss 118 protruding frontward from the contacting face 116, a rear face 122 opposite the contacting face 116, and a plurality of tightening holes 124 (FIG. 3) formed on the rear face 122. As illustrated in FIG. 3, the tightening holes 124 are e.g. tapped holes, and arranged so as to align around the axis $O_1$ at substantially equal intervals in the vicinity of an outer peripheral edge of the rear face 122.

When the object 100 is mounted to the predetermined attachment position on the mounting face 114, fasteners (not illustrated) such as bolts are inserted into the tightening holes 124 and tightened to tightening holes (e.g., tapped holes not illustrated) formed on the mounting face 114. As a result, the object 100 is fixed to the mounting face 114 at the predetermined attachment position.

Figure 2:
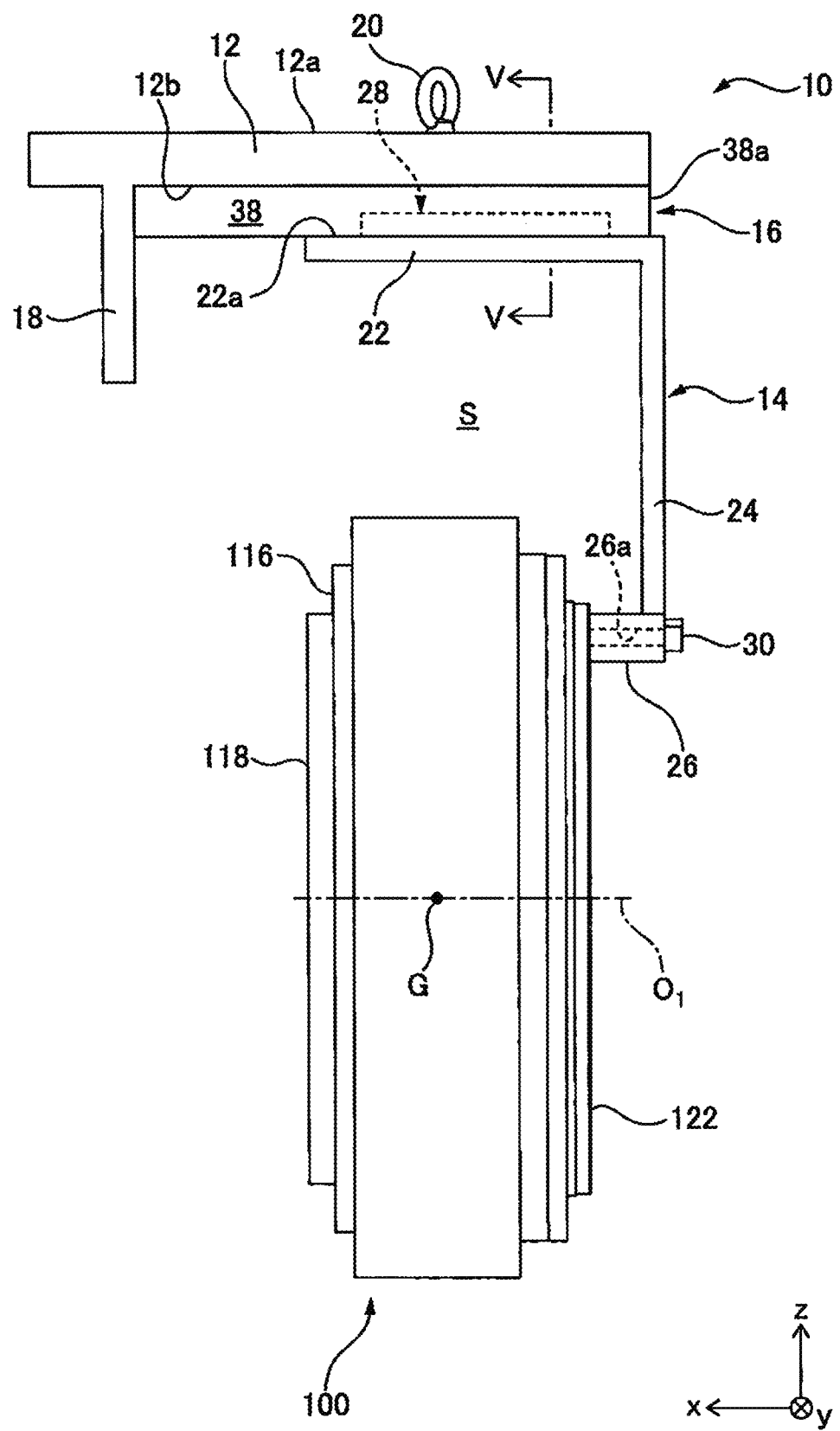
FIG. 2 illustrates an enlarged view of the transport tool holding an object.
Figure 4:
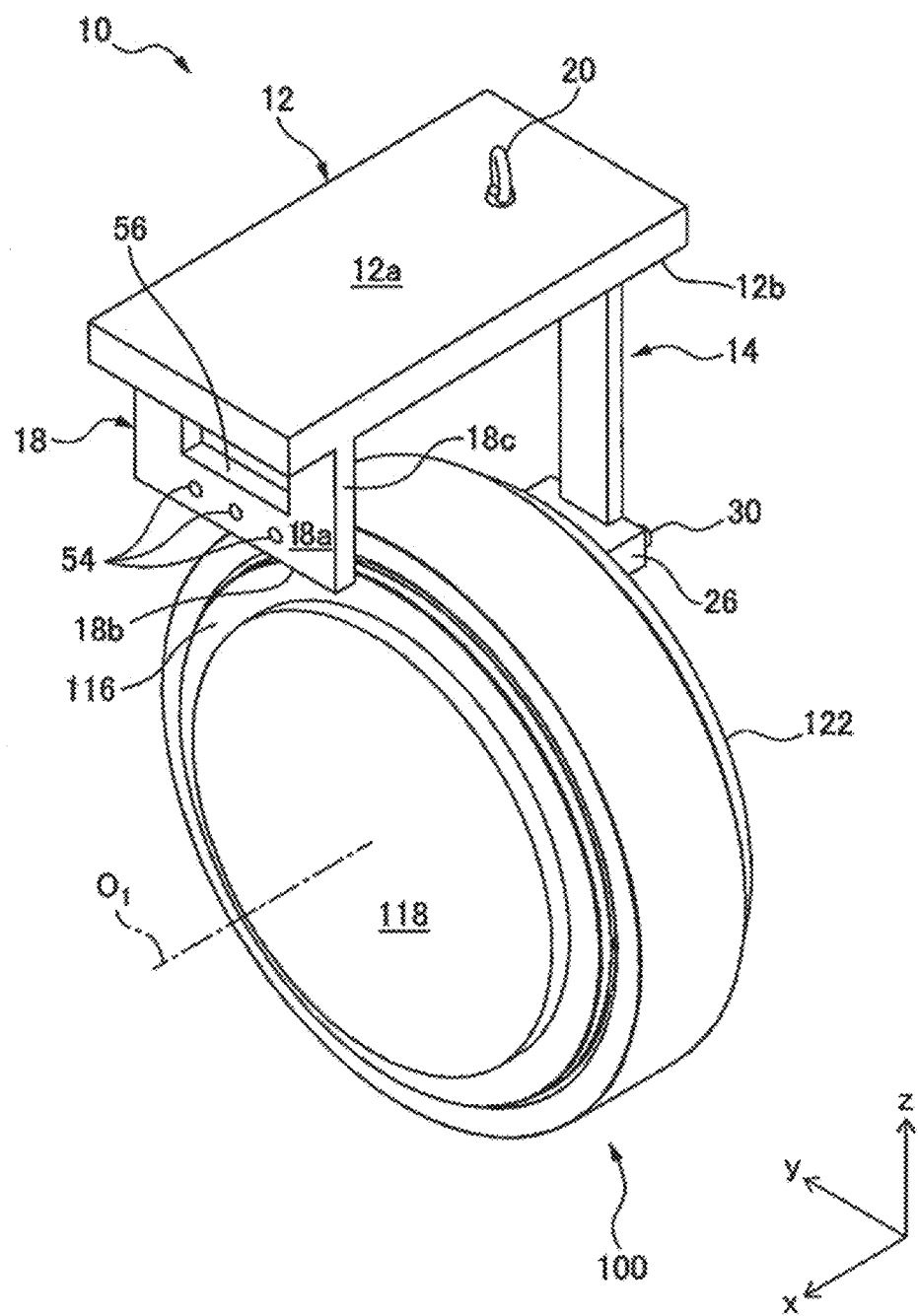
FIG. 4 is a frontward perspective view of the transport tool and the object illustrated in FIG. 2.

The transport tool 10 is suspended from a heavy machinery 120 (e.g., a forklift or a crane) while holding the object 100 as illustrated in FIG. 1, and transported by the heavy machinery. As illustrated in FIG. 2 to FIG. 4, the transport tool 10 includes a base 12, a holding section 14, a guide 16, a positioning section 18, and a handle 20 (e.g., an eyebolt).

The base 12 is a flat plate member having a substantially rectangular shape with a longitudinal direction in the x-axis direction. The handle 20 is fixed to an upper face 12a of the base 12. The holding section 14 is a rod member having an integral shape and bent in a substantial L-shape as viewed from the y-axis direction. The holding section 14 is supported by the base 12 at bottom side of the base 12 so as to be movable in the x-axis direction. The holding section 14 includes a first arm 22, a second arm 24, an attachment section 26, and an engagement rail 28.

The first arm 22 extends in the x-axis direction so as to be parallel with the base 12. The second arm 24 extends downward from a rear end of the first arm 22 so as to be orthogonal to the first arm 22. By the first arm 22 and the second arm 24 being orthogonal to each other, a space S (FIG. 2) is defined at upside of the object 100 held by the holding section 14.

The attachment section 26 is fixed to a bottom end of the second arm 24. The attachment section 26 is formed with a total of three through holes 26a (FIG. 2) extending through the attachment section 26 in the x-axis direction. These through holes 26a are arranged at positions corresponding to three of the tightening holes 124 formed on the rear face 122 of the object 100.

In other words, the through holes 26a are aligned along an arc-shaped track at the same interval as the tightening holes 124. Note that the attachment section 26 may extend in an arc shape in the alignment direction of the through holes 26a and the tightening holes 124. Further, the number of through holes 26a is not limited to three, but may be any number.

A total of three fasteners (e.g., bolts) 30 are inserted through the tightening hole 26a, and respectively tightened to the three tightening holes 124. Thus, the attachment section 26 is fixed to the rear face 122 of the object 100, whereby, the holding section 14 holds the object 100.

Thus, in this embodiment, the tightening holes 124 for mounting the object 100 to the mounting face 114 are utilized as tightening holes for fixing the attachment section 26 to the object 100. According to this configuration, it is not necessary to form in the object 100 additional tightening holes for fixing the attachment section 26 to the object 100.

Figure 5:
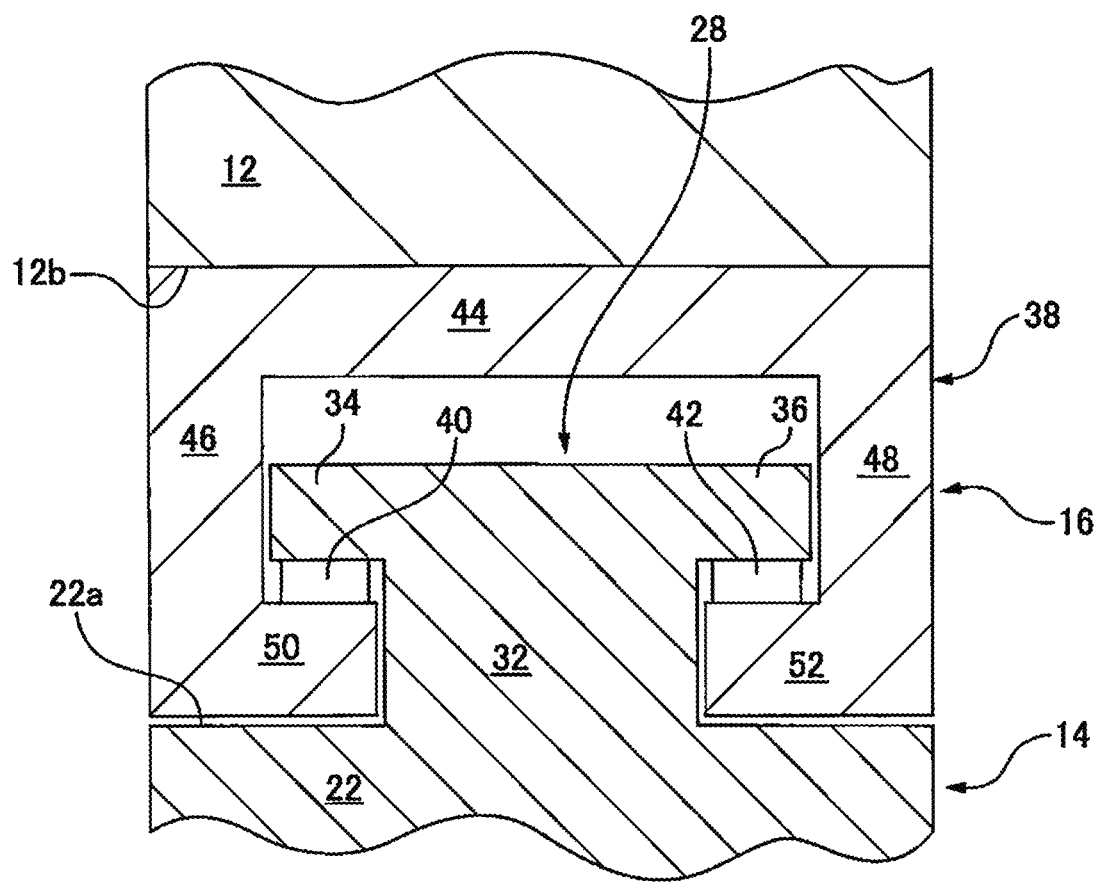
FIG. 5 is a cross-sectional view along V-V in FIG. 2.

The engagement rail 28 is fixedly provided at the first arm 22 so as to protrude upward from the upper face 22a of the first arm 22 and extend in the x-axis direction. As illustrated in FIG. 5, the engagement rail 28 has a substantially T-shaped cross section as viewed from the x-axis direction.

Specifically, the engagement rail 28 includes a base 32 protruding upward from the upper face 22a of the first arm 22, and claws 34 and 36 protruding from the base 32 to both sides in the y-axis direction. The engagement rail 28 is movably engaged with the guide 16, as described later.

The guide 16 is fixed to the bottom side of the base 12, and guides the movement of the holding section 14 in the x-axis direction while supporting the holding section 14 to the base 12. The guide 16 includes a main body 38 having a substantially C-shaped cross section and extending in the x-axis direction, a first row of rollers 40, and a second row of rollers 42 disposed so as to be separate rightward from the first row of rollers 40.

The main body 38 includes a base 44 fixed to a bottom face 12b of the base 12, a pair of side walls 46 and 48 extending downward from both ends of the base 44 in the y-axis direction so as to be opposite to each other, and a pair of claws 50 and 52 protruding inward from bottom ends of the side walls 46 and 48, respectively.

The first row of rollers 40 includes a plurality of cylindrical rollers aligned in the x-axis direction, and each of the cylindrical rollers is provided in the main body 38 so as to be rotatable about an axis parallel with the y-axis. The first row of rollers 40 are interposed between the claw 34 of the engagement rail 28 and the claw 50 of the main body 38.

Similarly to the first row of rollers 40, the second row of rollers 42 includes a plurality of cylindrical rollers aligned in the x-axis direction, and each of the cylindrical rollers is provided in the main body 38 so as to be rotatable about an axis parallel with the y axis. The second row of rollers 42 is interposed between the claw 36 of the engagement rail 28 and the claw 52 of the main body 38.

The engagement rail 28 engages the main body 38 via the first row of rollers 40 and the second row of rollers 42 in this way, whereby the holding section 14 is guided by the guide 16 so as to move in the x-axis direction along the base 12 while being prevented from disengaging downward from the main body 38.

In this embodiment, a guide track along which the guide 16 guides the holding section 14 passes a position where the center of gravity G of the object 100 during transport aligns with the handle 20 in the vertically downward direction (i.e., downward direction in a gravity direction).

The above-described base 12, the holding section 14, and the guide 16 each have a load bearing structure (e.g., a high-strength material, large cross-sectional area) capable of bear the heavy weight (e.g., 600 kg or greater) of the object 100.

Figure 6:
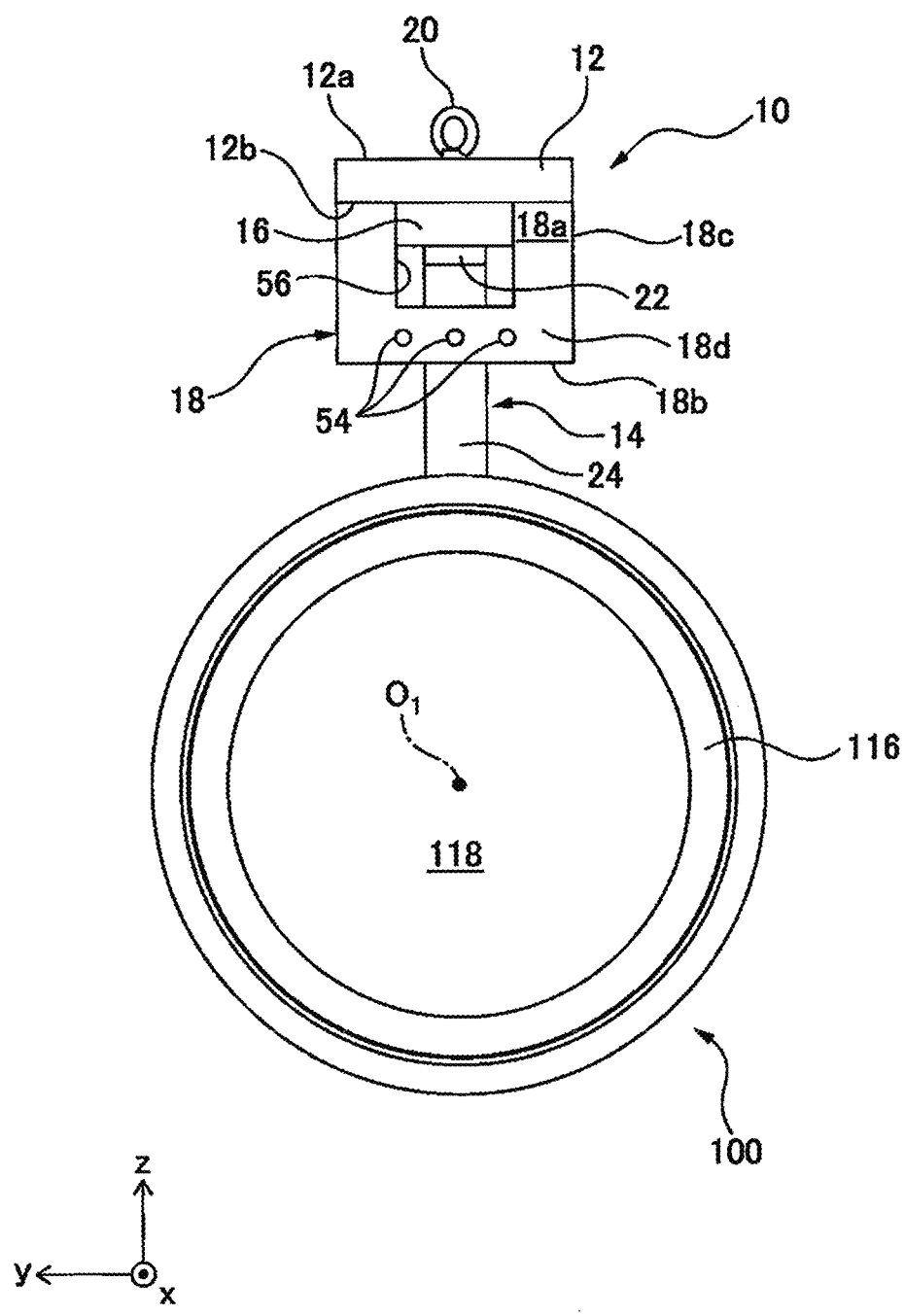
FIG. 6 is a diagram of the transport tool and the object illustrated in FIG. 2, as viewed from the front.

As illustrated in FIG. 3, FIG. 4, and FIG. 6, the positioning section 18 is a flat plate member immovably fixed to the base 12, and extends downward from the bottom face 12b of the base 12 so as to be opposite to the second arm 24 of the holding section 14.

The positioning section 18 includes a front face 18a, a bottom face 18b connected to a bottom edge of the front face 18a, and a left face 18c connected to a left edge of the front face 18a. Further, a total of three through holes 54 are formed at a lower section (fixing section) 18d of the positioning section 18 so as to extend through the positioning section 18 in the x-axis direction. Further, one escape hole 56 is formed at the center of the positioning section 18. The functions of these through holes 54 and the escape hole 56 will be described later.

Next, the function of the transport tool 10 will be described with reference to FIG. 1 and FIG. 7 to FIG. 14. As illustrated in FIG. 1, the transport tool 10 is suspended from the heavy machinery 120 while the object 100 is held by the holding section 14, and transported by the heavy machinery 120.

Specifically, as illustrated in FIG. 1, a chain 126 is set in the handle 20 of the transport tool 10, and suspended from a hook 128 provided at the heavy machinery 120. In this way, the transport tool 10 holding the object 100 is lifted up by the heavy machinery 120 via the handle 20, the chain 126, and the hook 128, and transported by the heavy machinery 120.

When the transport tool 10 is suspended and transported by the heavy machinery 120 before the object 100 is mounted to the mounting face 114, the holding section 14 is arranged relative to the base 12 such that the handle 20 is arranged vertically upward of the center of gravity G of the object 100 held by the transport tool 10.

In other words, the holding section 14 is arranged relative to the base 12 such that the position in the x-y plane of the center of gravity G of the object 100 held by the holding section 14 substantially coincides with that of the handle 20 of the base 12.

By such an arrangement between the handle 20 and the center of gravity G, the object 100 can be stably suspended from the heavy machinery 120 such that the object 100 remains stationary while the axis $O_1$ of the object 100 is substantially parallel with the x-axis direction (i.e., the horizontal direction), when the transport tool 10 is suspended from the heavy machinery 120 as illustrated in FIG. 1.

When the object 100 is mounted to the attachment position on the mounting face 114, the heavy machinery 120 is moved forward from the position illustrated in FIG. 1, and the positioning section 18 of the transport tool 10 is abutted against an abutting section 130 provided at the mounting object 102.

Figure 8:
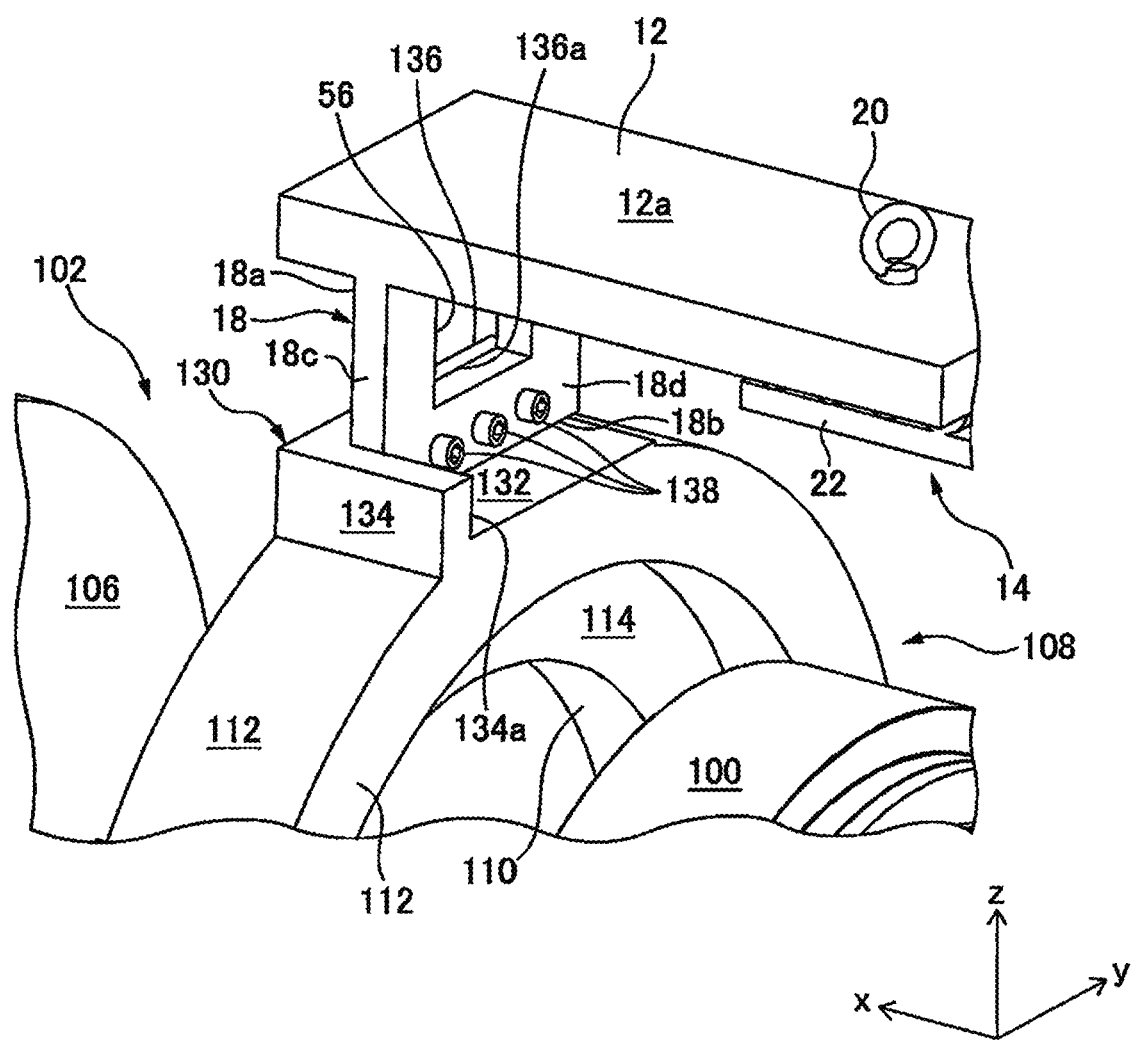
FIG. 8 is an enlarged view of the positioning section and the abutting section illustrated in FIG. 7.

This abutting section 130 will be described with reference to FIG. 7 to FIG. 9. The abutting section 130 is formed at an upper end of the flange 112 of the mounting object 102. Specifically, the abutting section 130 includes a flat face 132 and walls 134 and 136 extending upward from the flat face 132. The flat face 132 is arranged substantially parallel with the x-y plane.

The wall 134 is a flat plate member arranged substantially parallel with the x-z plane, and includes an abutting face 134a substantially parallel with the x-z plane. The wall 136 is a flat plate member arranged substantially parallel with the y-z plane (i.e., orthogonal to the wall 134), and includes an abutting face 136a substantially parallel with the y-z plane. Three tightening holes (not illustrated), to which fasteners 138 (e.g., bolts) described later are to be tightened, are formed on the abutting face 136a.

When the positioning section 18 of the transport tool 10 is abutted against the abutting section 130, the front face 18a of the positioning section 18 comes into contact with the abutting face 136a of the wall 136, the bottom face 18b of the positioning section 18 comes into contact with the flat face 132, and the left face 18c of the positioning section 18 comes into contact with the abutting face 134a of the wall 134.

In this state, the lower section 18d of the positioning section 18 is fixed to the wall 136 by the three fasteners 138. Specifically, the three fasteners 138 are respectively inserted through the through holes 54 formed at the lower section 18d, and tightened to the three tightening holes formed on the abutting face 136a of the wall 136. In this way, the base 12 is fixed to the mounting object 102.

Figure 10:
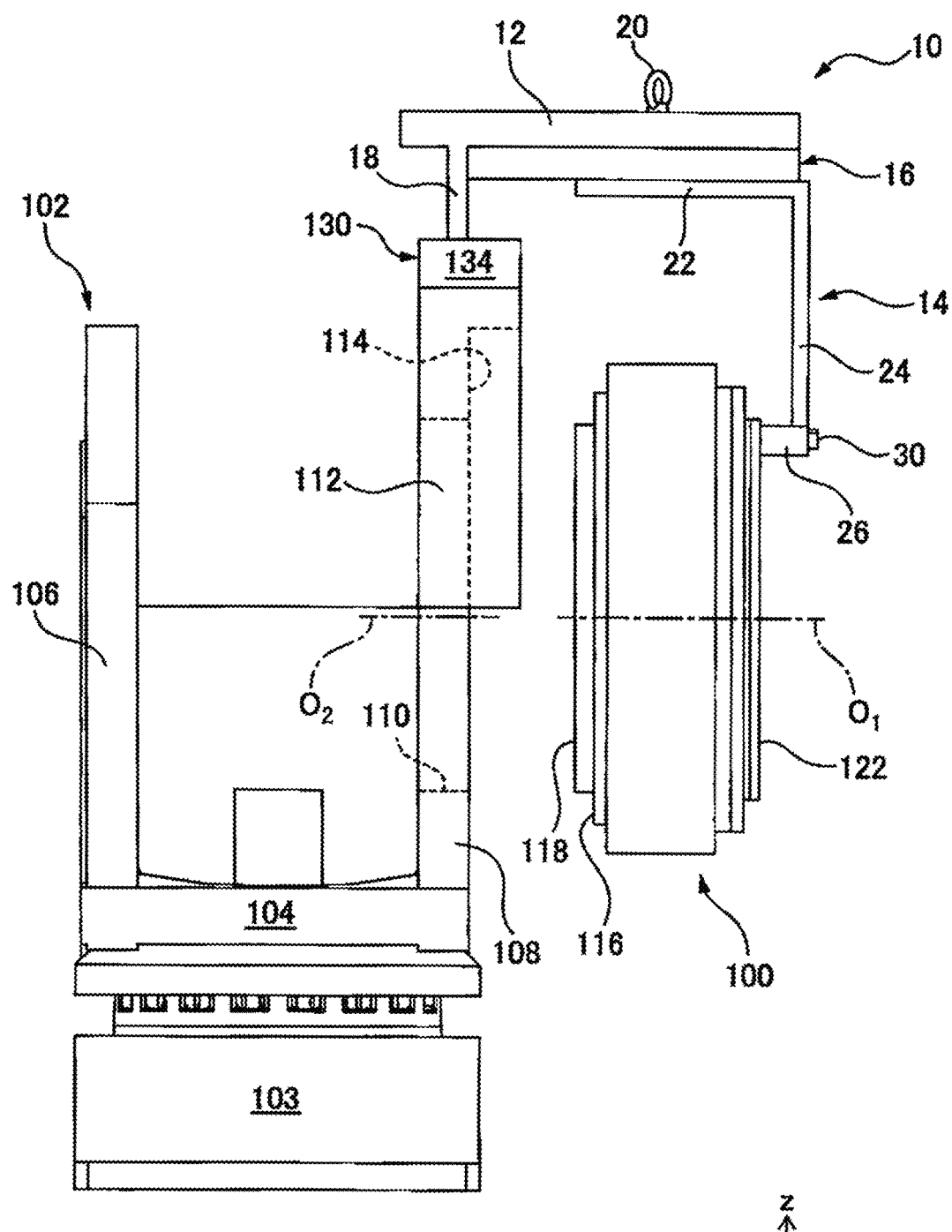
FIG. 10 is a side view of the transport tool, the object, and the mounting object illustrated in FIG. 7.

When the positioning section 18 is abutted against the abutting section 130, the object 100 held by the holding section 14 is arranged at a preparation position having a predetermined positional relationship with the attachment position on the mounting face 114, as illustrated in FIG. 7 and FIG. 10. At this time, an operator can carry out an attachment operation of attaching the object 100, which is arranged at the preparation position, to the attachment position on the mounting face 114 by moving the holding section 14.

In this embodiment, when the object 100 held by the holding section 14 is arranged at the preparation position, the axis $O_1$ of the object 100 and the movement direction of the holding section 14 relative to the base 12 (i.e., the guiding direction of the guide 16) are substantially parallel with the x-axis direction (i.e., the horizontal direction). That is, the axis $O_1$ of the object 100 is substantially orthogonal to the mounting face 114.

Further, as illustrated in FIG. 7 and FIG. 10, the axis $O_1$ of the object 100 held by the holding section 14 and the axis $O_2$ of the through hole 110 substantially coincide with each other, and the contacting face 116 of the object 100 faces the attachment position on the mounting face 114 in the x-axis direction.

Next, the operator pushes the object 100 (or the holding section 14) frontward. By this, the holding section 14 moves frontward relative to the base 12 while being guided by the guide 16. As a result, the object 100 is arranged at the attachment position on the mounting face 114 as illustrated in FIG. 11 to FIG. 13.

When the object 100 is arranged at the attachment position, the boss 118 of the object 100 is concentrically inserted into the through hole 110 formed in the side wall 108 of the mounting object 102, and the contacting face 116 of the object 100 comes into surface-contact with the mounting face 114.

Figure 11:
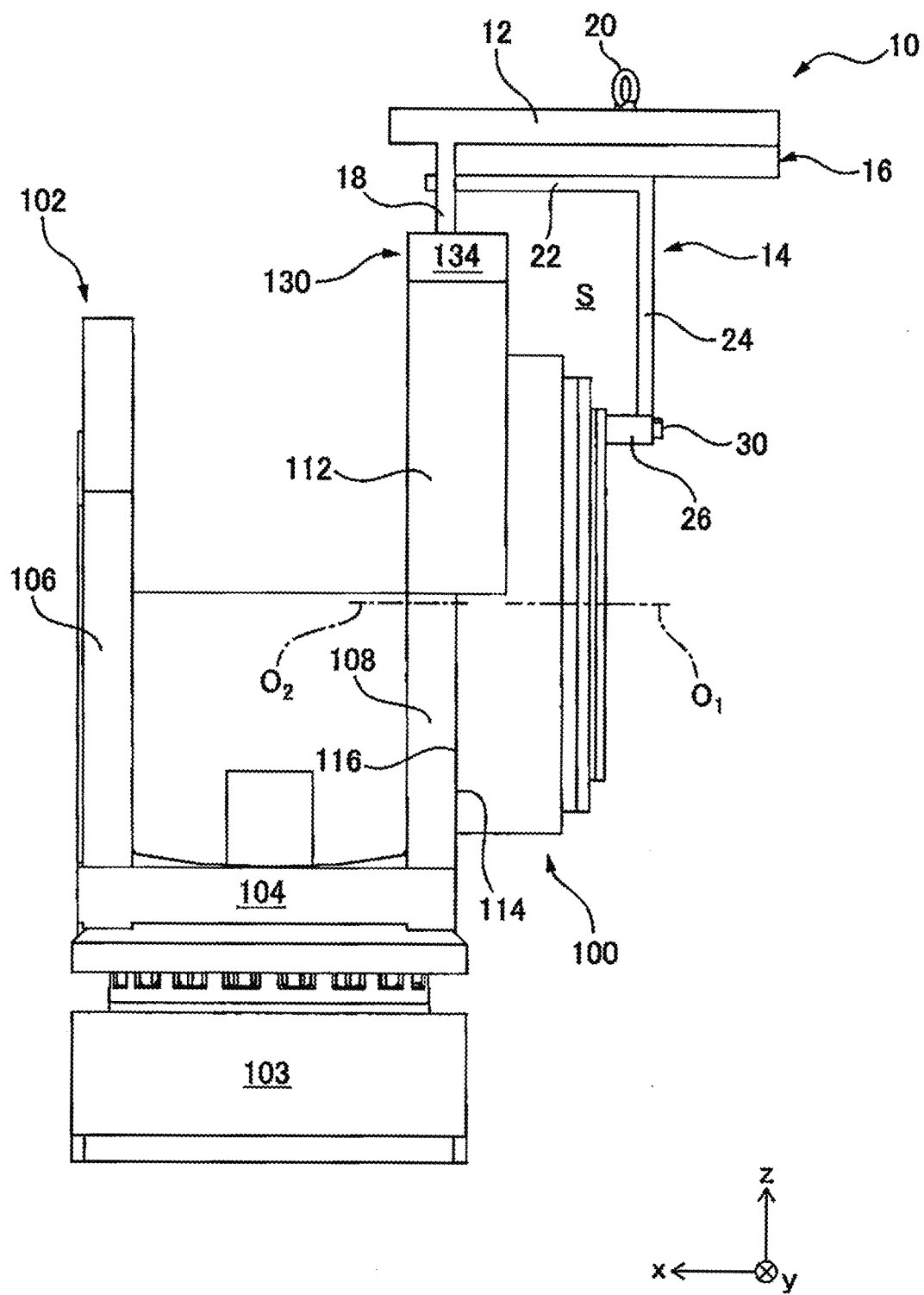
FIG. 11 illustrates the object arranged in an attachment position after the transport tool illustrated in FIG. 7 is moved frontward.
Figure 12:
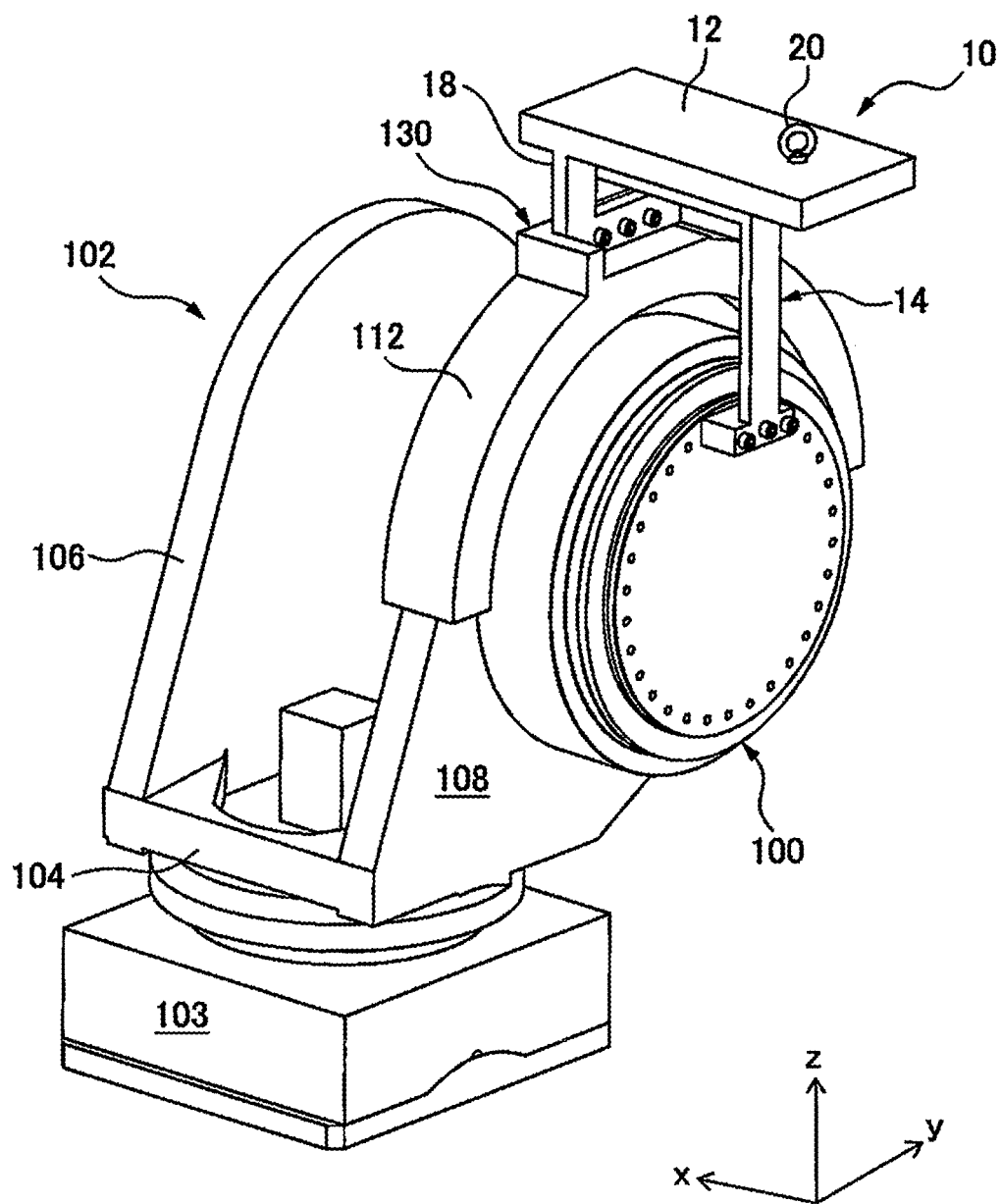
FIG. 12 is a rearward perspective view of the transport tool, the object, and the mounting object illustrated in FIG. 11.
Figure 13:
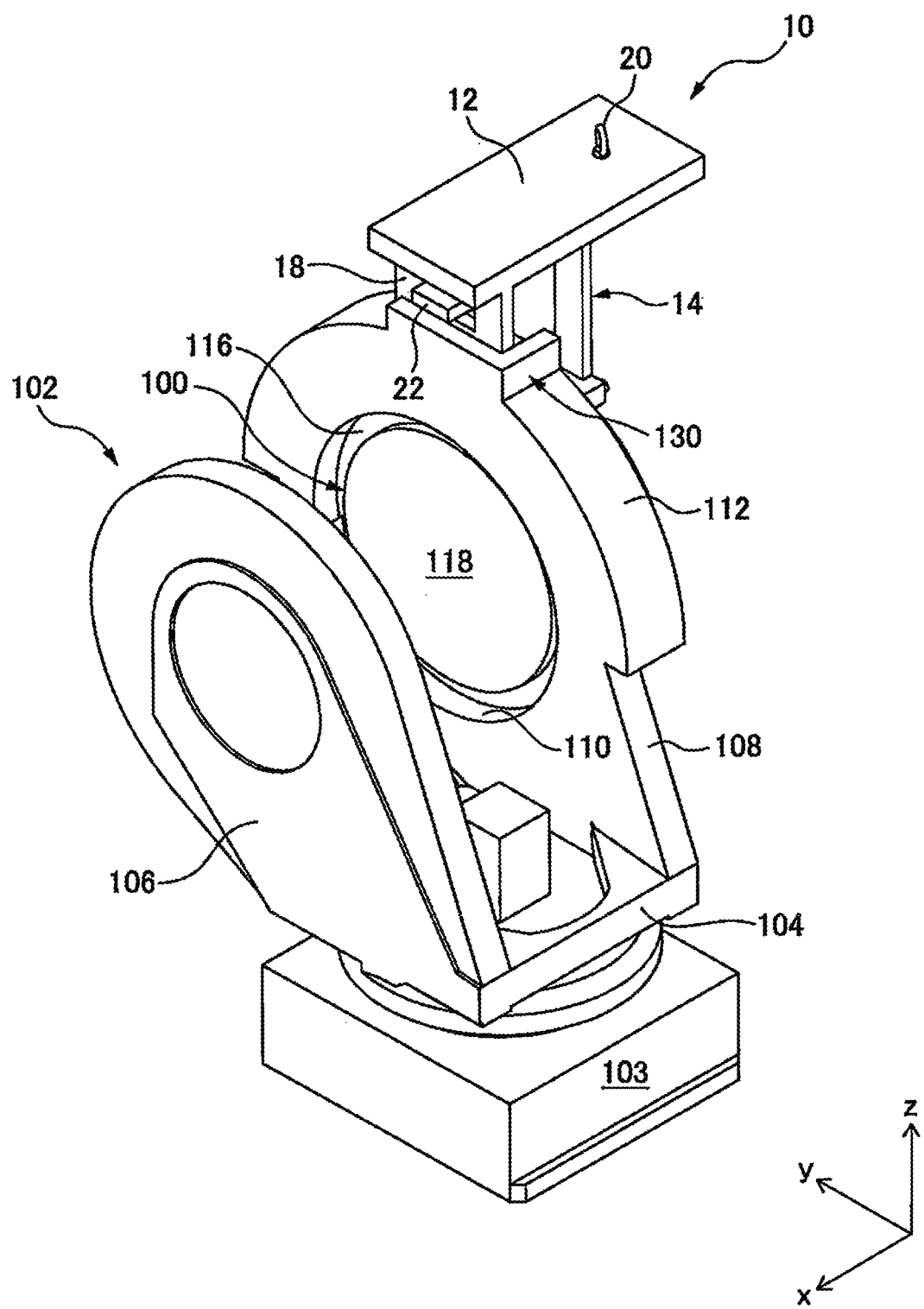
FIG. 13 is a frontward perspective view of the transport tool, the object, and the mounting object illustrated in FIG. 11.
Figure 14:
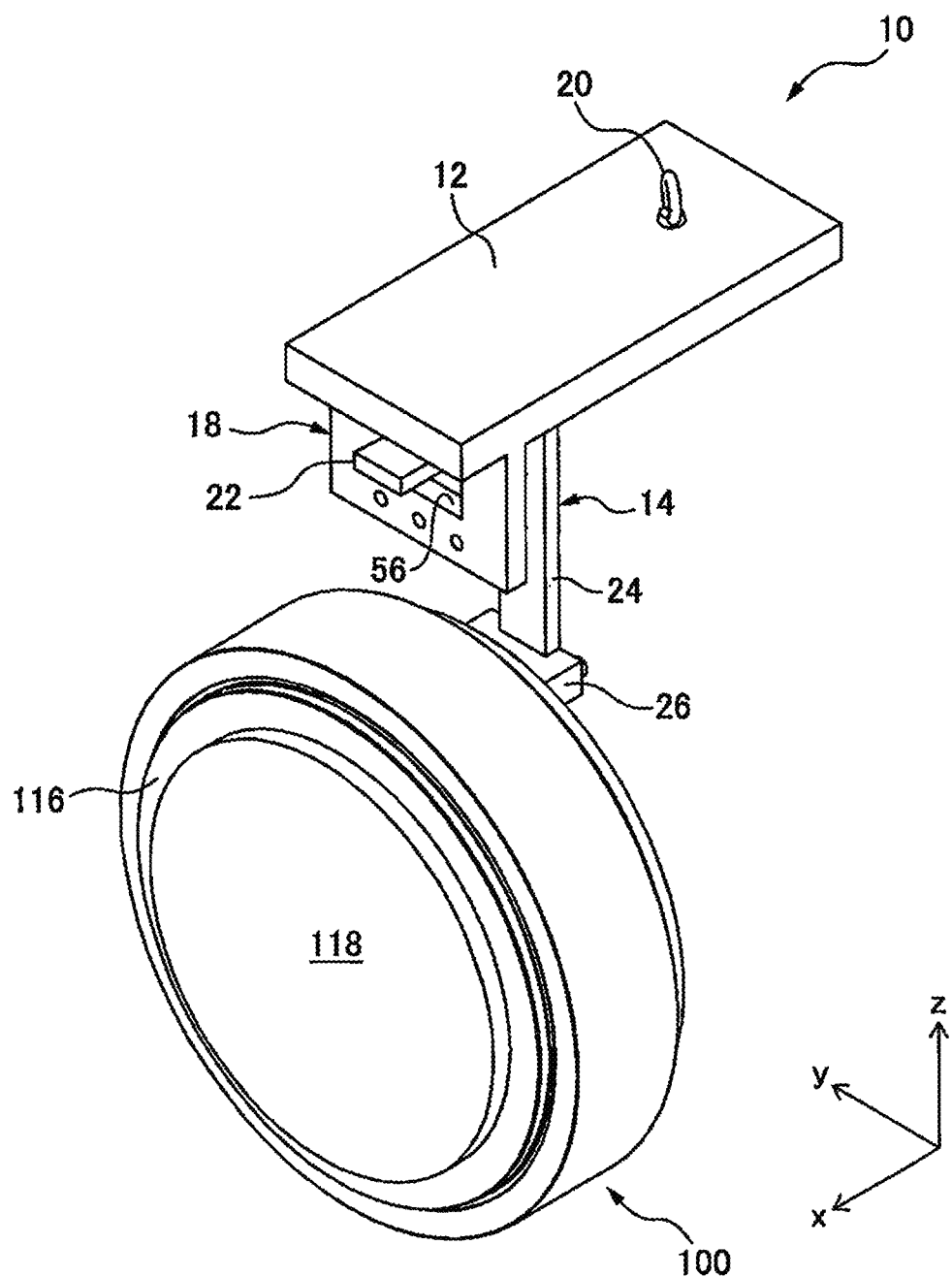
FIG. 14 is an enlarged perspective view omitting the mounting object from the drawing illustrated in FIG. 13.

At this time, as illustrated in FIG. 11, FIG. 13, and FIG. 14, a distal end of the first arm 22 of the holding section 14 is received in the escape hole 56 formed in the positioning section 18. Due to this escape hole 56, it is possible to prevent interference between the holding section 14 and the positioning section 18 when the holding section 14 is moved frontward from the preparation position illustrated in FIG. 7.

Further, when the holding section 14 is moved frontward from the position illustrated in FIG. 1, a member (e.g., the flange 112) of the mounting object 102 can be inserted into the space S defined by the first arm 22 and the second arm 24. Due to this, interference between the member (the flange 112) of the mounting object 102 and the holding section 14 can be prevented.

Then, the operator respectively inserts the plurality of fasteners (not illustrated) such as bolts into the tightening holes 124, and tightens the plurality of fasteners to the plurality of tightening holes (not illustrated) formed at positions corresponding to the tightening holes 124 in the mounting face 114 to fix the object 100 to the mounting face 114.

Then, the operator removes the fasteners 138 (FIG. 7 and FIG. 8) to release the positioning section 18 from the abutting section 130, and removes the fasteners 30 (FIG. 3) to release the attachment section 26 from the object 100. Then, the operator moves the holding section 14 rearward so as to separate away from the object 100. In this way, the object 100 can be attached to the mounting face 114 in the predetermined attachment position.

On the other hand, when the object 100 is to be removed from the mounting face 114, the operator fixes the attachment section 26 of the transport tool 10 to the rear face 122 of the object 100 by the fasteners 30, while the transport tool 10 is suspended from the heavy machinery 120.

Then, the operator removes the fasteners, which tighten the object 100 and the mounting face 114 to each other, from the mounting face 114 and the tightening holes 124 of the object 100. Then, the operator pushes the object 100 (or the holding section 14) rearward so as to separate away from the mounting face 114. Then, the heavy machinery 120 is moved to transport the object 100 held by the transport tool 10 to a predetermined location.

As described above, according to the transport tool 10 of this embodiment, the operator can attach the object 100 to the attachment position by arranging the object 100 at the preparation position using the positioning section 18, and then moving the holding section 14 frontward.

According to this configuration, when it is necessary to position the object 100 at the predetermined attachment position during the attachment of the object 100, the object 100 can be easily positioned at the attachment position, whereby it is possible to simplify the mounting operation of the object 100.

Further, since the operator can move the object 100 arranged at the preparation position by the holding section 14, the operator can carry out the mounting operation of the object 100 without moving the heavy machinery 120. Thus, even when there is no sufficient space for moving the heavy machinery 120 forward or backward due to the spatial condition of the work space, it is possible to carry out mounting the heavy object 100 to the mounting face 114.

Further, in this embodiment, the holding section 14 is guided to move in the x-axis direction by the guide 16 while being supported by the base 12. According to this configuration, the object 100 can be easily reciprocated in the x-axis direction on the same track while the weight of the object 10 is born.

Figure 15:
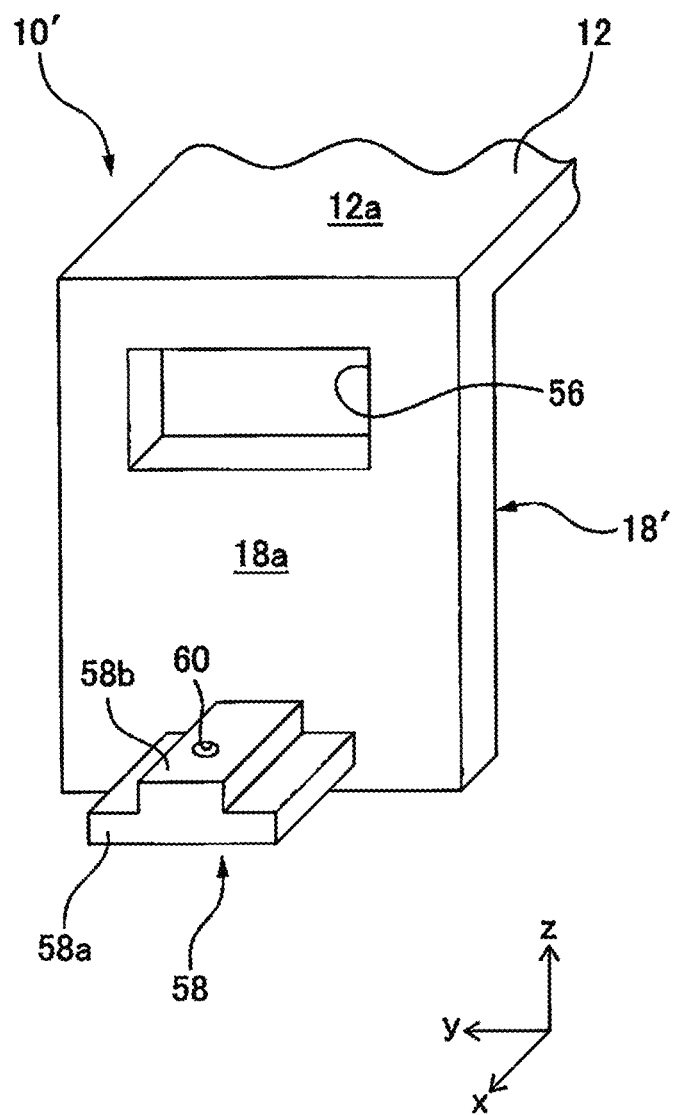
FIG. 15 illustrates the positioning section according to another embodiment.

Next, a transport tool 10' and an abutting section 130' according to another embodiment are described with reference to FIG. 15 to FIG. 17. As illustrated in FIG. 15, the transport tool 10' according to this embodiment differs from the above-described transport tool 10 in a positioning section 18'. Specifically, the positioning section 18' includes an engaging section 58, instead of the above-described through holes 54. The engaging section 58 is provided so as to protrude frontward from the front face 18a of the positioning section 18'.

More specifically, the engaging section 58 includes a first section 58a, and a second section 58b integrally provided on a top side of the first section 58a and having a width in the y-axis direction smaller than that of the first section 58a. A hole 60 is formed on an upper face of the second section 58b so as to be recessed downward from the upper face.

Figure 16:
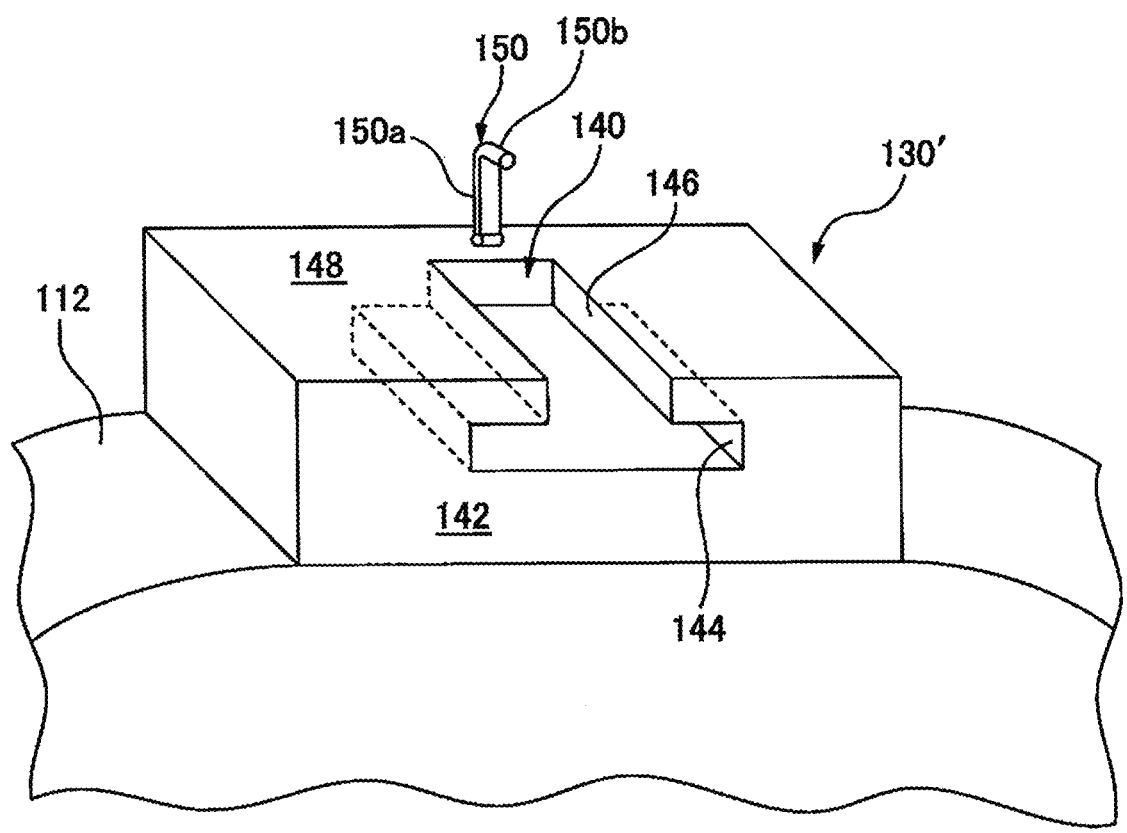
FIG. 16 illustrates the abutting section according to another embodiment.

As illustrated in FIG. 16, the abutting section 130' of this embodiment is formed at the upper end of the flange 112 of the mounting object 102, and includes a recess 140. The recess 140 is formed in the abutting section 130' so as to recess frontward from a rear face 142 of the abutting section 130'.

More specifically, the recess 140 includes a first hole 144, and a second hole 146 connected to upside of the first hole 144 and having a width in the y-axis direction smaller than that of the first hole 144.

The first hole 144 can receive the first section 58a of the engaging section 58, while the second hole 146 can receive the second section 58b of the engaging section 58. The second hole 146 opens to the outside at an upper face 148 of the abutting section 130'.

A movement restricting section 150 is provided on the upper face 148 of the abutting section 130'. In this embodiment, the movement restricting section 150 is a substantially L-shaped member as viewed from the y-axis direction, and includes a proximal part 150a, and a distal part 150b orthogonal to the proximal part 150a.

The proximal part 150a is attached, at its proximal end, to the upper face 148 so as to be rotatable about an axis parallel with the y-axis direction. The distal part 150b is insertable into the hole 60 formed in the second section 58b of the engaging section 58.

When the positioning section 18' is abutted against the abutting section 130', the operator fits the engaging section 58 into the recess 140, as illustrated in FIG. 17. Due to this, the engaging section 58 engages the recess 140, whereby the frontward movement and movement on the z-y plane of the base 12 is restricted.

When the positioning section 18' is thus abutted against the abutting section 130' such that the engaging section 58 is fitted into the recess 140, the object 100 held by the transport tool 10' is arranged at the preparation position, as in the embodiment illustrated in FIG. 7.

Then, the operator rotates the movement restricting section 150 to insert the distal part 150b of the movement restricting section 150 into the hole 60 of the engaging section 58. Thus, the movement restricting section 150 engages the hole 60 so as to restrict the rearward movement of the base 12. As a result, the base 12 is fixed to the mounting object 102. Accordingly, in this embodiment, the hole 60 functions as a fixing section for fixing the base 12 to the mounting object 102.

According to this embodiment, since tightening the fasteners 138 stated above can be omitted, it is possible to simplify arranging the object 100 held by the holding section 14 at the preparation position by the positioning section 18'.

Note that the movement restricting section 150 may be omitted from this embodiment. Even in this case, the frontward movement and movement on the z-y plane of the transport tool 10 are restricted when the engaging section 58 is fitted into the recess 140, and whereby it is possible to arrange the object 100 at the preparation position in the same way as in FIG. 7.

Figure 18:
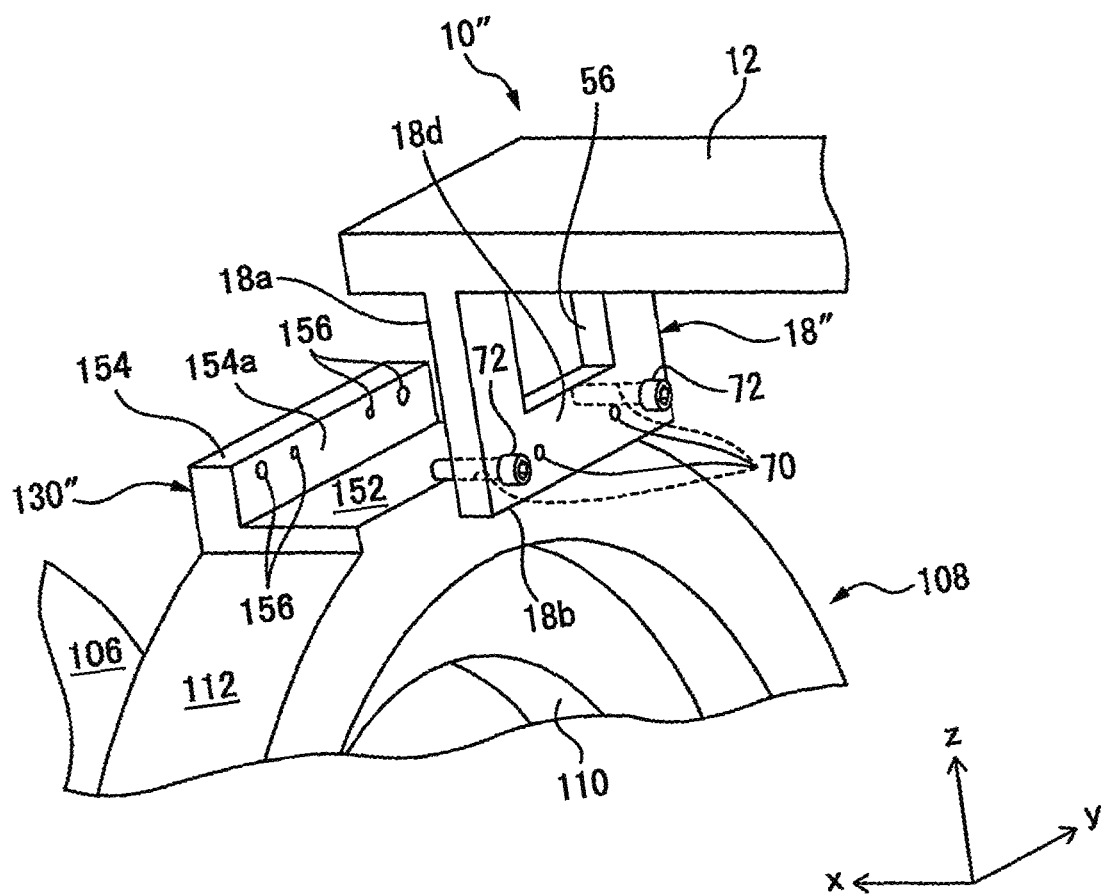
FIG. 18 illustrates the positioning section and the abutting section according to yet another embodiment.

Next, a transport tool 10" and an abutting section 130" according to still another embodiment are described with reference to FIG. 18 to FIG. 19. The transport tool 10" according to this embodiment differs from the above-described transport tool 10 in a positioning section 18". Specifically, the lower section (fixing section) 18d of the positioning section 18" is formed with a total of four through holes 70.

On the other hand, the abutting section 130" according to this embodiment is formed on the upper end of the flange 112 of the mounting object 102, and includes a flat face 152 and a wall 154 rising upward from a front edge of the flat face 152.

The wall 154 includes an abutting face 154a which is substantially parallel with the y-z plane and which is formed with a total of four holes 156 arranged at positions corresponding to the through holes 70 formed in the positioning section 18".

Figure 19:
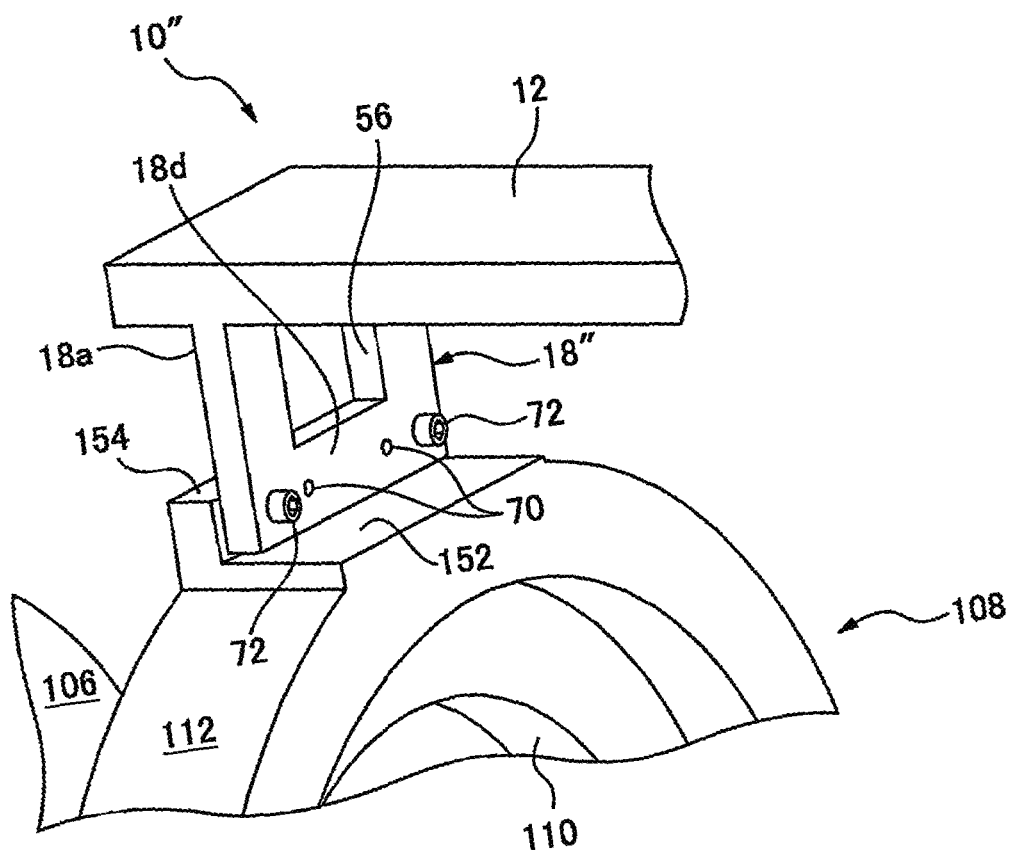
FIG. 19 is a cross-sectional view illustrating the positioning section illustrated in FIG. 18 abutted and fixed against the abutting section.

When the positioning section 18" is abutted against the abutting section 130" as illustrated in FIG. 19, the front face 18a of the positioning section 18" comes into contact with the abutting face 154a of the wall 154, and the bottom face 18b of the positioning section 18" comes into contact with the flat face 152.

At this time, the object 100 held by the transport tool 10" is arranged at the preparation position, similarly as the embodiment illustrated in FIG. 7.

In this state, pins 72 are inserted through the through holes 70 of the positioning section 18" and the holes 156 of the wall 154. Due to this, the positioning section 18" is restricted from moving frontward and on the y-z plane relative to the abutting section 130". As a result, the base 12 is fixed to the mounting object 102 so as to be immovable in the frontward direction and the direction on the y-z plane.

According to this embodiment, since tightening the fasteners 138 stated above can be omitted, it is possible to simplify arranging the object 100 held by the holding section 14 at the preparation position by the positioning section 18".

Figure 20:
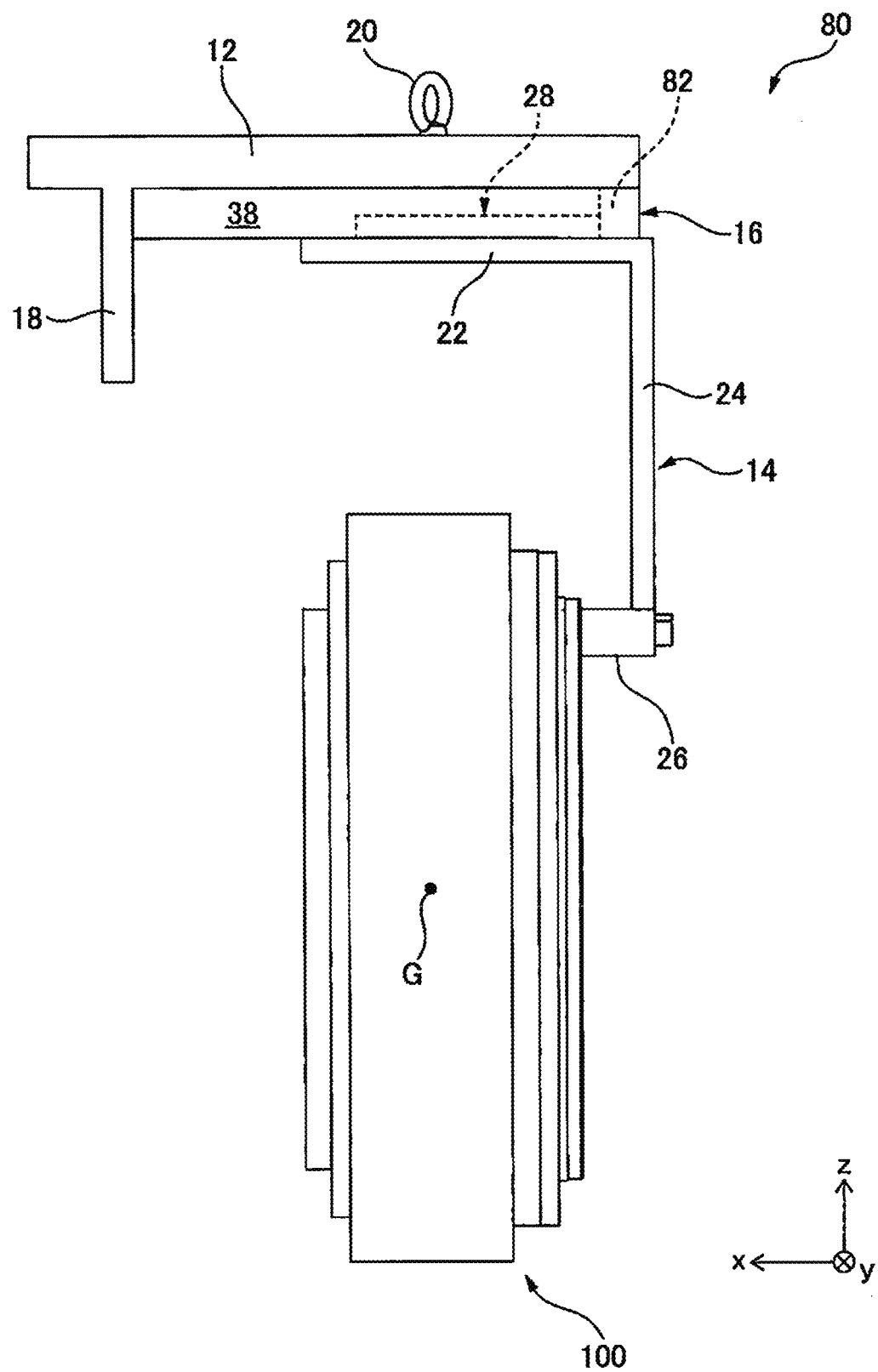
FIG. 20 is a side view of the transport tool according to yet another embodiment.

Note that, in the above-described embodiment, a mechanism for releasably holding the holding section 14 at a predetermined position in its movement stroke may be further provided. Such an embodiment is illustrated in FIG. 20. A transport tool 80 illustrated in FIG. 20 differs from the above-described transport tool 10 in that it further includes a position holding mechanism 82. The position holding mechanism 82 is installed inside the main body 38 of the guide 16.

As an example, the position holding mechanism 82 releasably engages the engagement rail 28 of the holding section 14, and restricts the movement of the holding section 14 in the x-axis direction when engaging the engagement rail 28. As another example, the holding section 14 is comprised of a magnetic material, while the position holding mechanism 82 includes e.g. a magnet and attracts the engagement rail 28 by a magnetic force so as to restrict the movement of the holding section 14 in the x-axis direction.

Thus, the position holding mechanism 82 releasably holds the holding section 14 in a predetermined position. For example, the position holding mechanism 82 is configured to maintain the position of the holding section 14 illustrated in FIG. 20. In the position illustrated in FIG. 20, the center of gravity G of the object 100 held by the holding section 14 is arranged vertically downward of the handle 20.

According to this embodiment, since a state where the handle 20 is positioned upward of the center of gravity G of the object 100 is maintained by the position holding mechanism 82, it is possible to effectively prevent the object 100 from swinging during the transport of the object 100.

Note that the position holding mechanism 82 may be provided outside the main body 38 of the guide 16 or at the base 12, instead of being provided inside the main body 38. In this case, the position holding mechanism 82 may be configured to detachably engage the first arm 22 (or the second arm 24). Further, the position holding mechanism 82 may be configured to hold the position of the holding section 14 when the holding section 14 is arranged at the rear end of its movement stroke.

Further, in the above-described embodiment, the holding section 14 may be configured such that the center of gravity G of the object 100 held by the holding section 14 is arranged vertically downward of the handle 20 when the holding section 14 is arranged at the rear end of its movement stroke. Further, when the holding section 14 is arranged at the rear end of its movement stroke, the rear end of the engagement rail 28 may come into contact with a rear end wall 38a (FIG. 2) of the main body 38.

Further, the object 100 is not limited to the reducer, but may be a motor provided in an industrial robot, or a die of a molding machine or the like. Similarly, the mounting object 102 is not limited to the turning body of the robot, but may be any component (robot base, robot arm, etc.) of a robot, or a die receiving section configured to receive a die.

Further, the fixing mechanism for fixing the positioning sections 18, 18', 18" to the abutting sections 130, 130', 130" is not limited to the above-described fasteners, but may be any mechanism capable of releasably fixing the positioning sections 18, 18', 18" to the abutting sections 130, 130', 130", such as a structure configured to attract an object by a magnetic force or the like.

Further, in the above-described embodiments, the operator manually moves the holding section 14. However, the transport tool 10, 10', 10", or 80 may include a drive section configured to move the holding section 14 relative to the base 12. This drive section may be e.g. a servo motor, or a hydraulic or pneumatic cylinder.

Further, the guide 16 may be omitted from the above-described embodiments, and the holding section 14 may be directly provided at the base 12 so as to be movable. For example, the holding section 14 may be supported by the base 12 via a ball screw mechanism built in the base 12, so as to be moveable along the x-y plane.

While the present disclosure has been described through specific embodiments, the above-described embodiments do not limit the invention as defined by the appended claims.

The invention claimed is:

1. A transport tool used for transporting an object to be attached to a predetermined attachment position, the object having front and rear end faces and a circumferential surface extending between the front and rear end faces, the transport tool comprising:
   a base;
   a holding section supported by the base so as to be movable in a predetermined axis, and configured to hold the object;
   a positioning section provided at the base and configured to arrange the object held by the holding section at a preparation position having a predetermined positional relationship with the predetermined attachment position, the positioning section enabling an attachment operation to attach the object arranged at the preparation position to the predetermined attachment position by moving the holding section in a first direction along the predetermined axis relative to the base,
   wherein the holding section includes:
      a first arm extending along the predetermined axis and supported by the base;
      a second arm formed integrally with an end, away from the positioning section, of the first, the second arm extending downward from the end of the first arm in a direction away from the base so as to intersect with the predetermined axis; and
      an attachment section formed at an end, away from the first arm, of the second arm, and coupled to the rear end face of the object, the object being suspended at the attachment section such that the whole weight of the object is applied to the attachment section.

2. The transport tool according to claim 1, wherein the positioning section includes a fixing section configured to fix the base to a mounting object.

3. The transport tool according to claim 1, further comprising a guide configured to guide the holding section along the predetermined axis relative to the base.

4. The transport tool according to claim 3, wherein the predetermined attachment position is provided on a flat face, and
wherein the predetermined axis is substantially orthogonal to the flat face.

5. A transport tool used for transporting an object to be attached to a predetermined attachment position, the transport tool comprising:
a base;
a holding section supported by the base so as to be movable in a predetermined axis, and configured to hold the object;
a positioning section provided at the base and configured to arrange the object held by the holding section at a preparation position having a predetermined positional relationship with the predetermined attachment position, the positioning section enabling an attachment operation to attach the object arranged at the preparation position to the predetermined attachment position by moving the holding section in a first direction along the predetermined axis relative to the base;
a guide configured to guide the holding section along the predetermined axis relative to the base; and
a handle provided at the base and configured to enable the transport tool to be lifted up during transport of the object,
wherein the holding section includes:
a first arm extending along the predetermined axis and supported by the base; and
a second arm formed integrally with an end, away from the positioning section, of the first arm, the second arm extending downward from the end of the first arm in a direction away from the base so as to intersect with the predetermined axis, the object being suspended at a distal end of the second arm such that the whole weight of the object is applied to the second arm via an attachment section fixed to a face of the object,
wherein by the guide passes a position where a center of gravity of the object during transport aligns with the handle in a downward direction of a gravity direction.

6. A transport tool used for transporting an object to be attached to a predetermined attachment position, the transport tool comprising:
a base;
a holding section supported by the base so as to be movable in a predetermined axis, and configured to hold the object; and
a positioning section provided at the base and configured to arrange the object held by the holding section at a preparation position having a predetermined positional relationship with the predetermined attachment position, the positioning section enabling an attachment operation to attach the object arranged at the preparation position to the predetermined attachment position by moving the holding section in a first direction along the predetermined axis relative to the base,
wherein the holding section includes:
a first arm extending along the predetermined axis and supported by the base; and
a second arm formed integrally with an end, away from the positioning section, of the first arm, the second arm extending downward from the end of the first arm in a direction away from the base so as to intersect with the predetermined axis, the object being suspended at a distal end of the second arm such that the whole weight of the object is applied to the second arm via an attachment section fixed to a face of the object,
wherein the positioning section includes an escape hole configured to receive an end of the first arm in the first direction and prevent interference between the positioning section and the first arm when the holding section is moved along the predetermined axis.

7. A transport tool used for transporting an object to be attached to a predetermined attachment position, the transport tool comprising:
a base;
a holding section supported by the base so as to be movable in a predetermined axis, and configured to hold the object; and
a positioning section provided at the base and configured to arrange the object held by the holding section at a preparation position having a predetermined positional relationship with the predetermined attachment position, the positioning section enabling an attachment operation to attach the object arranged at the preparation position to the predetermined attachment position by moving the holding section in a first direction along the predetermined axis relative to the base,
wherein the holding section includes:
a first arm extending along the predetermined axis and supported by the base; and
a second arm formed integrally with an end, away from the positioning section, of the first arm, the second arm extending downward from the end of the first arm in a direction away from the base so as to intersect with the predetermined axis, the object being suspended at a distal end of the second arm such that the whole weight of the object is applied to the second arm via an attachment section fixed to a face of the object,
wherein the attachment section includes a plurality of through holes arranged at positions corresponding to a plurality of tightening holes formed on a face of the object,
wherein the attachment section is fixed to the face of the object by a plurality of fasteners inserted through the plurality of through holes.

* * * * *